United States Patent
Lubbs et al.

(10) Patent No.: US 8,391,320 B2
(45) Date of Patent: Mar. 5, 2013

(54) STATE-BASED MANAGEMENT OF MESSAGING SYSTEM JITTER BUFFERS

(75) Inventors: Stephen Lubbs, Longmont, CO (US); Paul Roller Michaelis, Louisville, CO (US)

(73) Assignee: Avaya Inc., Basking Ridge, NJ (US)

( * ) Notice: Subject to any disclaimer, the term of this patent is extended or adjusted under 35 U.S.C. 154(b) by 437 days.

(21) Appl. No.: 12/510,479

(22) Filed: Jul. 28, 2009

(65) Prior Publication Data

US 2011/0026691 A1 Feb. 3, 2011

(51) Int. Cl.
*H04J 3/08* (2006.01)
*H04L 7/00* (2006.01)

(52) U.S. Cl. ......................................... 370/516; 375/371

(58) Field of Classification Search .... 379/88.12–88.23; 455/343.1; 370/230.1, 252, 390, 516, 352, 370/395.64; 375/371
See application file for complete search history.

(56) References Cited

U.S. PATENT DOCUMENTS

| | | | | |
|---|---|---|---|---|
| 6,683,889 | B1 * | 1/2004 | Shaffer et al. | 370/516 |
| 7,746,847 | B2 * | 6/2010 | Chitturi | 370/352 |
| 7,881,284 | B2 * | 2/2011 | Lin et al. | 370/352 |
| 2004/0258047 | A1 * | 12/2004 | Miao | 370/352 |
| 2007/0004374 | A1 * | 1/2007 | Kneckt | 455/343.1 |
| 2007/0064679 | A1 * | 3/2007 | Chitturi | 370/352 |
| 2007/0211704 | A1 * | 9/2007 | Lin et al. | 370/356 |
| 2008/0285599 | A1 * | 11/2008 | Johansson et al. | 370/516 |
| 2010/0271944 | A1 * | 10/2010 | Michaelis et al. | 370/230.1 |
| 2010/0285778 | A1 * | 11/2010 | Bluvband et al. | 455/412.2 |

OTHER PUBLICATIONS

Michaelis et al., U.S. Appl. No. 12/426,023, filed Apr. 17, 2009.

\* cited by examiner

*Primary Examiner* — Mohammad Islam
(74) *Attorney, Agent, or Firm* — Sheridan Ross P.C.

(57) ABSTRACT

Buffering is made more efficient by resizing a jitter buffer based, for example, on a user's location within a TUI. To illustrate how this might be implemented in a TUI-based system, assume that two jitter buffer sizes are available: a larger one for voice and a smaller one for DTMF. Assume that the ability to select the buffer size is software-controllable. By virtue of the TUI structure, the initial state for a communication session could be a buffer size appropriate for DTMF. Since the messaging system may provide an audible beep whenever it's appropriate for a user to speak, the same subroutine within the TUI code that triggers the beep could also command the buffer management mechanism instructing it to size the buffer for voice. Any subsequent DTMF entry or other event indicating that voice input has been terminated could cause the buffer to resize appropriately for DTMF.

20 Claims, 2 Drawing Sheets

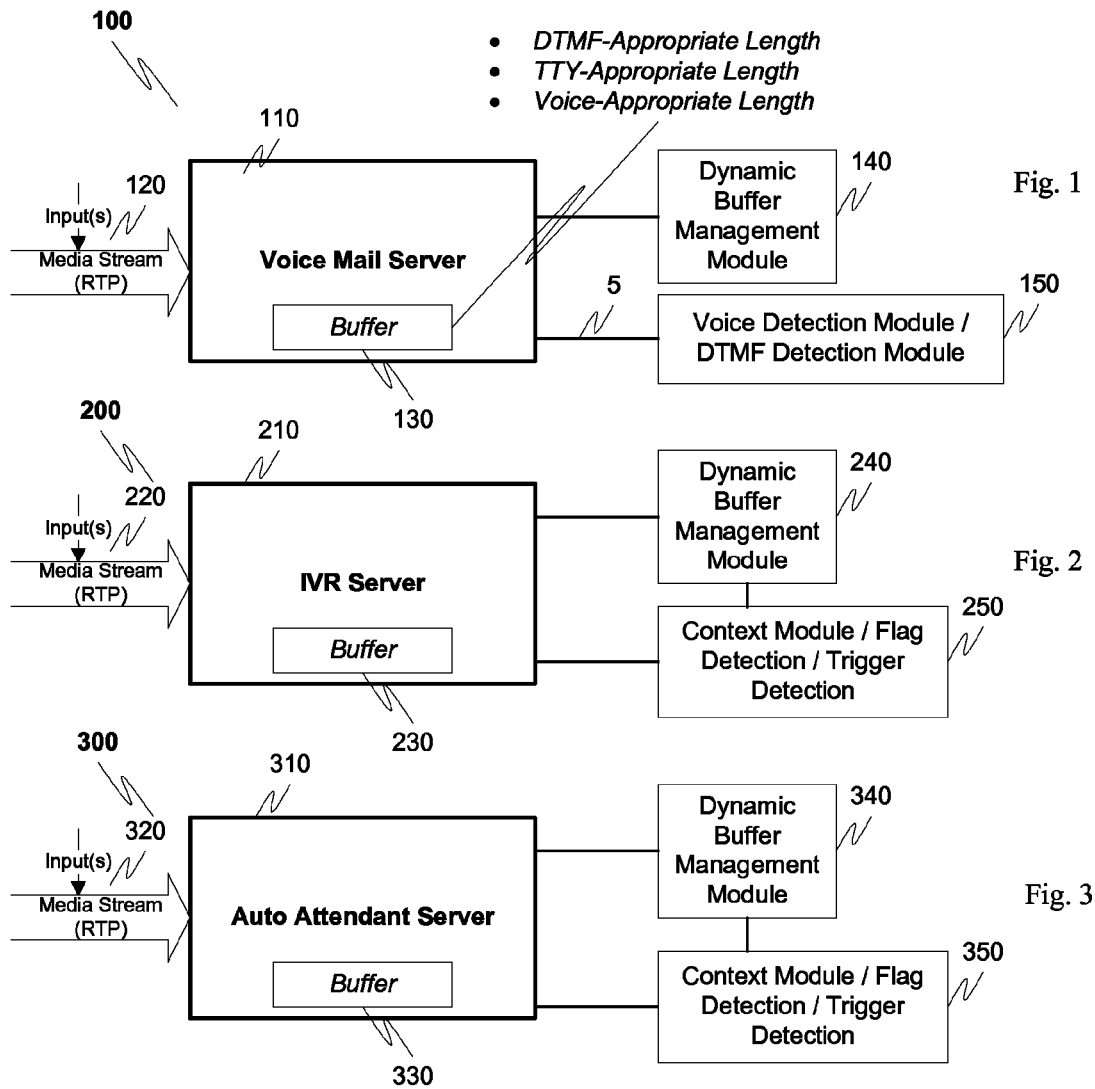

STATE-BASED MANAGEMENT OF MESSAGING SYSTEM JITTER BUFFERS

FIELD OF THE INVENTION

An exemplary aspect of the invention relates to communications systems. More specifically, an exemplary aspect of the invention relates to managing a jitter buffer. Even more specifically, an exemplary aspect of the invention relates to dynamically modifying the size of a jitter buffer based on one or more triggering events.

BACKGROUND OF THE INVENTION

Voicemail is a centralized system managing telephone messages for a user, and is commonly seen in enterprise-type environments where a voicemail system provides telephone message management for a large number of people. A typical voicemail system can allow the answering and recording of multiple voicemail messages in parallel. Additional functionality often associated with voicemail systems is the ability to store incoming voice messages in personalized mailboxes associated with a particular user's phone number or extension. Users are capable of forwarding messages to another mailbox, and sending messages to one or more voicemail users. In conjunction with both of these functions, a user can add a voice introduction to a forwarded message and store a voice message for future delivery to one or more other users.

Other functionality associated with voicemail systems is the ability to make calls to a telephone or paging service to notify a user a message has arrived in their mailbox, as well as the ability to provide messaging notification by SMS, a special dial tone, one or more lights, or using caller ID signaling. Furthermore, a user can be alerted to the existence of a new voicemail message through integration and communication between the voice message server and a mail client. For example, a voicemail server can forward a .wav file that includes the left message to an email server that then displays the voicemail message as a playable file in a user's mailbox.

There are also automated voicemail systems for processing incoming speech based on messages. For example, a voicemail processor includes a transcription component for transcribing one or more voicemail messages into text, a text retrieval component for indexing the one or more transcribed voicemail messages, an information extraction component for identifying selected information within the one or more indexed voicemail messages, and a user interface for displaying the identified selected information from the one or more indexed voicemail messages.

Interactive Voice Response (IVR) is an interactive technology that allows a system to detect a voice and keypads input, and also provide information and/or queries to a user. IVR technology is used extensively in telecommunications, such as in call centers, and is being introduced into other environments. A typical IVR system is based around a menu structure that provides various voice prompts to a user. Dual-Tone Multi-Frequency (DTMF) signals, entered via the telephone keypad and natural language speech recognition interpret the caller's responses to various voice prompts. IVR systems can be embodied as equipment installed at a customer's premise, equipment installed at the PSTN, provided by an application service provider, and/or a virtually hosted IVR.

An Automatic Call Distribution system (ACD) is often a first point of contact when many large businesses are contacted by a customer. An ACD typically uses digital storage devices to play greetings or announcements, and typically routes a caller without prompting for input. An IVR can play announcements and request an input from the caller. This information can be used to profile a caller and route the call to an agent with a particular skill set. In addition, Interactive Voice Response (IVR) can be used as a front-end to a call center operation by identifying the needs of the caller. Information can be obtained from the caller such as account numbers, name, calling from number, and the like. Answers to simple questions such as account balances or pre-recorded information can be provided without operator intervention. Account numbers from the IVR can be compared to caller ID data for security reasons and additional IVR responses can optionally be required if the caller ID data does not match the account record.

IVR call flow can be created and managed in a multitude of ways. A traditional IVR was typically dependant on proprietary programming or scripting languages, whereas more modern IVR applications can be structured similar to www pages using voice xml, SALT, or t-xml languages. The ability to use xml developed applications allows a web server to act as an application server, freeing the developer to focus on a call flow as opposed to the actual coding.

Many tools are available to further simplify the application development process. A call flow diagram can be drawn with a GUI tool and the application code (voice xml or SALT) can be automatically generated. Additionally, many tools provide natural extensions to assist with software integration, such as http interfacing to websites and java interfaces for connecting databases.

An Auto Attendant system, also known as an Automated Attendant, allows callers to be automatically transferred to an extension without the intervention of an operator. An Automated Attendant also offers a simple menu system (e.g., for billing press 1, for service press 2, for technical support press 3, etc.). Many Auto Attendants also allow a caller's access to an operator by dialing a number, such as "0."

While IVR systems and Auto Attendants do share some commonality in terms of functionality, Automated Attendants are traditionally directed toward replacing a live operator to assist with call routing. In contrast, an IVR can be far more sophisticated and perform numerous types of functions to assist with telephone-based banking, accounting inquiries, and the like.

An IVR system interacts with a caller according to a call-flow diagram. A call-flow diagram can by constructed by a number of elements with each element prompting the caller to provide a response. These responses can be one or more of a voice response, a DTMF response, and a TTY response. For example, the IVR systems menu can be based on the following elements: a prompt element, a menu element, a speech element, a digit element, a recording element, a call transfer element, and a go-to element. The prompt element plays one or more audio or multimedia prompts. These prompts can include pre-recorded audio or multimedia files, or automatically generated audio using, for example, text-to-speech. The menu element tells the IVR system to expect a touch-tone key response. The speech element tells the IVR system to expect a speech response from the caller. The digit element tells the IVR system to expect a series of touch tone keys that, for example, are concluded with the pound key. For example, this element can be used to collect an account number or SSN. The recording element tells the IVR system to expect the caller to record a voice message. The caller can hang up the phone or press the pound key when finished to complete a recording. The call transfer element transfers the call to another phone number optionally with use of a screen pop. The go-to element allows the IVR system go-to another element in IVR system's call flow.

Jitter is the time variation of a characteristic of periodic signal in electronics and telecommunications, often in relation to a reference clock source. Jitter may be observed in characteristics such as the frequency of successive pulses, the signal amplitude or phase of periodic signals, or the like. Jitter is a significant and usually undesirable factor in the design of almost all communications links. A jitter buffer, also known as a de-jitter buffer, counters jitter introduced by queuing in packet switched networks so that a continuous play-out of audio, video, or multimedia transmitted over the network can be insured. The maximum jitter that can be removed by a jitter buffer is equal to the buffering delay introduced before starting the play-out of the media stream. Some systems use algorithm-based delay-optimal jitter buffers that are capable of adapting the buffering delay to changing network jitter characteristics. These adaptive jitter buffers and the adaption logic are typically based on the jitter estimates computed from the arrival characteristics of the media packets. Adaptive jitter buffering involves introducing discontinuities in a media play-out, which may appear offensive to the listener or the viewer. Adaptive jitter buffering is usually carried out for audio play-outs that feature voice activity detection or discontinuous transmission encoded audio, that allows the links of the silence periods to be adjusted, thus minimizing the perceptual impact of the adaptation.

Another aspect of jitter buffers is important to consider. Specifically, what are commonly referred to as "lost packets" or "missing packets" in VoIP systems are often actually delayed packets. They will arrive at their destination eventually. A VoIP device that is able to wait longer for the packets to arrive—i.e., a system that has a larger jitter buffer—may be expected to provide better audio quality when used in networks in which some packets are delayed, but at the expense of greater latency between the time of transmission and the time of delivery by the buffer to the downstream resource.

SUMMARY OF THE INVENTION

Jitter buffers can be dynamically updated based on network conditions. However, all media streams are sent to the same jitter buffer. An exemplary embodiment of this invention recognizes, for example, based on a location within a TUI and characteristics of the announcement sent, that different types of permissible or legal input can be predicted for any given node in the user interface. The jitter buffer can then be adjusted based on the predicted legal input. One exemplary benefit of doing so is that the optimal size of a jitter buffer will vary depending on the nature of the anticipated user input; illustratively, a jitter buffer that is long enough to support reliable automatic speech recognition may, because of its length, cause unnecessary delays in the system's response to simple DTMF inputs.

As discussed herein, and although the illustrative scenarios are messaging applications, jitter buffer problems can exist in any VoIP telephone-access menu-based system in which the "legal" user's responses may be voiced or DTMF at some points in the menu structure, and DTMF-only at other points. Similarly, although the illustrative scenarios are based on H.323-based messaging systems and SIP-messaging based systems, the problems can exists in any telephone-access menu-based system in which the media transport is accomplished via the real-time transport protocol, also known as RTP, and in which TTY and DTMF signals are transported inline using RTP packets.

An important aspect of of IVR, voice mail, and automated attendant applications is that the telephone user interfaces tend to be organized in a way that can be represented with a flow chart in which the nodes may have more than one available output branch. At the nodes that have more than one available output branch, user actions typically determine which branch is taken. Within the context of the proposed invention, at some of the nodes, the only permitted user action (i.e., the only type of user input that can elicit a response from the system) is a DTMF entry. At other nodes, the system may accept a spoken user response that the system records but does not analyze via an automatic speech recognition process (e.g., a voice mail message). At other nodes, an automatic speech recognition process may be employed, illustratively to allow users to use voice commands in place of DTMF entries.

More specifically, in a typical TUI, there are nodes in which the system is "listening for" a DTMF event. For example, after listening to a message, the prompt heard by subscribers is: "To respond or forward press 1, to delete press *D, to skip press the pound key." By contract, if a user presses the appropriate key to begin recording a message, the system then listens to the user's voice while simultaneously also sensing for DTMF. In some current IP-integrated messaging systems, the packets associated with the media stream e.g., the voice messages being recorded by users, are assembled and smoothed in a jitter buffer prior to being recorded. DTMF events, i.e., the users' "touch tone" commands, do not go into this buffer. Instead, they are transmitted to the system via QSIG. (An ISDN based signaling protocol for signaling between private branch exchanges in a private integrated service network).

In contrast, and is usual in a SIP-based messaging system, the DTMF events typically in the form of non-audio RFC-2833 packets go into the same jitter buffer that is used for the media stream. Keeping in mind that there are nodes in the media structure in which the only legitimate user response is a DTMF event, it is clear that there are occasions in which requiring the event to pass all the way through a jitter buffer that is sized appropriately for voice has the effect of slowing the system response while also wasting system resources.

Additionally, the effects of packet loss on perceived voice quality are well known. However, to describe the problem as "packet loss" may misstate the nature of the problem. This is because, in many cases, packets are not lost. Instead, the packets delivered are delayed past the point where they can be used. In real-time person-to-person voice conversations, waiting more than 200 milliseconds for a delayed packet is impractical because this would introduce a degree of latency that makes it awkward to interrupt the conversation or to interject comments in a timely manner. For this reason, the size of a jitter buffer should represent a balance between latency and voice quality. An interesting aspect of the problem is that although latencies of over 200 milliseconds are unacceptable in real-time person-to-person voice conversations, latencies several times larger than that may not be noticeable in messaging systems. This means that messaging systems have the ability to improve voice quality in exchange for latency, in a manner that isn't feasible with telephones. Indeed, there are examples of automatic resizing of messaging system jitter buffers based on factors that include network performance as discussed above.

In voice communication, packet loss rates on the order of two or three percent are generally regarded as acceptable. In contrast, when the Baudot tones of TTYs (also know as TDDs) are transmitted in-band, a packet loss rate of just 0.12% will cause the character error rate to exceed the maximum permitted by the FCC. (In this context, it is important to note that the US Code of Federal Regulations, 36 CFR Part 1194.23(c). requires voice mail, IVR and automated attendant systems to be usable by TTY users with their TTYs.) For this reason, the optimal size of the jitter buffer in a messaging system will be different, depending on whether the audio information is voice or TTY. Messaging systems do not provide functionality where voice or TTY is a factor that influences how the jitter buffer is sized, or at least addressed.

The above problems have a linkage that might not be obvious. The problem of packet loss is solved by expanding the jitter buffer to a size appropriate for TTY support, requiring DTMF events to travel through the same buffer would cause an unacceptable delay in system response times.

SIP-based telephone-access menu-based systems use the same jitter buffer for media and for signaling. A jitter buffer in systems such as a Communication Manager Messaging, size the jitter buffer appropriately for voice. This necessarily causes an undesirable delay in the system's response to DTMF commands.

As discussed, an interesting aspect of telephone-access menu-based systems—notably, messaging systems such as Avaya's Intuity™ product, is that there are specific locations within a menu structure in which the system is "listening" for voice. In the Intuity™ telephone user interface, without exception, arrival at these locations is preceded by an audible beep that indicates to users that they should begin speaking. There are other locations within the menu structure in which the system is "listening" only for DTMF user responses. Thus, there are readily identifiable portions of the TUI menu structure in which a somewhat larger jitter buffer is desired in order to provide good voice quality, and readily identifiable portions of the menu structures in which a somewhat shorter buffer is desirable is order to provide a faster response to, for example, DTMF inputs.

An exemplary aspect of the present invention addresses this problem by resizing the jitter buffer, based on the user's location within the TUI menu. To illustrate how this might be implemented in a messaging system that has a TUI, assume that two jitter buffer sizes are available: a larger one appropriate for voice and a smaller for appropriate for DTMF. Assume also that the ability to select the buffer size is software-controllable. By virtue of how the TUI is structured, the initial state for a communication session could be a buffer size appropriate for DTMF. Keeping in mind that the messaging system may always provide an audible beep whenever it's appropriate for a user to speak, the same sub-routine within the TUI code that triggers the beep could also send a command to the buffer management mechanism, instructing it to size the buffer appropriate for voice. Any subsequent DTMF entry or other event indicating that voice input has been terminated, would cause the buffer to resize appropriately for DTMF.

In accordance with one exemplary embodiment, the basic concept above would take into account that a jitter buffer size that is appropriate for voice, may be shorter than the optimal size for in-band Baudot TTY signals. This is because in-band Baudot TTY transmissions will exceed the FCC's acceptable limit for TTY character error rate when packet loss exceeds just 0.12%. Given that this is a much lower packet loss rate than is generally required for voice, it would make sense for the messaging to wait a bit longer for delayed TTY packets than it would ordinarily wait for voice. Keeping in mind that systems allow users to select the announcement set they prefer, one exemplary aspect of the invention is for the system to base the jitter-buffer sizing not just on the current location within the menu structure, but also on the announcement set the user has selected. Specifically, if the user has specified a voice-based announcement set, the buffer management system could toggle between a short DTMF-appropriate buffer and a long voice-appropriate buffer. And if the user has requested TTY-format announcements, the system can assume that the voice-appropriate buffer may be inadequate, and that the system should therefore toggle between a short DTMF-appropriate buffer and a very-long TTY-appropriate buffer.

Accordingly, aspects of the invention relate to dynamic management of a jitter buffer based on expected input from a caller.

Additional aspects of the invention relate to dynamic adjustment of a jitter buffer based on predicted or detected information from a caller.

Even further aspects of the invention relate to recognizing a trigger in a TUI menu structure and adjusting the size of a jitter buffer based on the trigger.

Even further aspects of the invention relate to context-based adjustment of a jitter buffer based on, for example, menu structure.

Even further aspects of the invention related to dynamic jitter buffer management in one or more of a voice mail system, an IVR system, and an Auto Attendant system.

Still further aspects of the invention relate to dynamically adjusting a jitter buffer for media sent via an RTP protocol.

Additional aspects of the invention relate to inserting a binary flag in the code for a TUI, with this binary flag being a trigger that tells a jitter buffer management module to adjust, or eliminate a jitter buffer.

Aspects of the invention also relate to recognizing the state of a server, such as a server associated with a voice mail system, an IVR system, or an Auto Attendant system, in dynamically adjusting a jitter buffer based on that state.

The present invention can provide a number of advantages depending on the particular configuration. These and other advantages will be apparent from the disclosure of the invention(s) contained herein.

The phrases "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

The term "a" or "an" entity refers to one or more of that entity. As such, the terms "a" (or "an"), "one or more" and "at least one" can be used interchangeably herein. It is also to be noted that the terms "comprising", "including", and "having" can be used interchangeably.

The term "automatic" and variations thereof, as used herein, refers to any process or operation done without material human input when the process or operation is performed. However, a process or operation can be automatic even if performance of the process or operation uses human input, whether material or immaterial, received before performance of the process or operation. Human input is deemed to be material if such input influences how the process or operation will be performed. Human input that consents to the performance of the process or operation is not deemed to be "material."

The term "computer-readable medium" as used herein refers to any tangible storage and/or transmission medium that participate in providing instructions to a processor for execution. Such a medium may take many forms, including but not limited to, non-volatile media, volatile media, and transmission media. Non-volatile media includes, for example, NVRAM, or magnetic or optical disks. Volatile media includes dynamic memory, such as main memory. Common forms of computer-readable media include, for example, a floppy disk, a flexible disk, hard disk, magnetic tape, or any other magnetic medium, magneto-optical medium, a CD-ROM, any other optical medium, punch cards, paper tape, any other physical medium with patterns of holes, a RAM, a PROM, and EPROM, a FLASH-EPROM, a solid state medium like a memory card, any other memory chip or cartridge, a carrier wave as described hereinafter, or any other medium from which a computer can read. A digital file attachment to e-mail or other self-contained information archive or set of archives is considered a distribution medium equivalent to a tangible storage medium. When the computer-readable media is configured as a database, it is to be understood that the database may be any type of database, such as relational, hierarchical, object-oriented, and/or the like.

While circuit or packet-switched types of communications can be used with the present invention, the concepts and techniques disclosed herein are applicable to other protocols.

Accordingly, the invention is considered to include a tangible storage medium or distribution medium and prior art-recognized equivalents and successor media, in which the software implementations of the present invention are stored.

The terms "determine," "calculate" and "compute," and variations thereof, as used herein, are used interchangeably and include any type of methodology, process, mathematical operation or technique.

The term "module" as used herein refers to any known or later developed hardware, software, firmware, artificial intelligence, fuzzy logic, or combination of hardware and software that is capable of performing the functionality associated with that element. Also, while the invention is described in terms of exemplary embodiments, it should be appreciated that individual aspects of the invention can be separately claimed.

The preceding is a simplified summary of the invention to provide an understanding of some aspects of the invention. This summary is neither an extensive nor exhaustive overview of the invention and its various embodiments. It is intended neither to identify key or critical elements of the invention nor to delineate the scope of the invention but to present selected concepts of the invention in a simplified form as an introduction to the more detailed description presented below. As will be appreciated, other embodiments of the invention are possible utilizing, alone or in combination, one or more of the features set forth above or described in detail below.

BRIEF DESCRIPTION OF THE DRAWINGS

FIG. 1 illustrates an exemplary voice mail system according to this invention;

FIG. 2 illustrates an exemplary IVR system according to this invention;

FIG. 3 illustrates an exemplary Auto Attendant system according to this invention.

DETAILED DESCRIPTION

Figure 4:
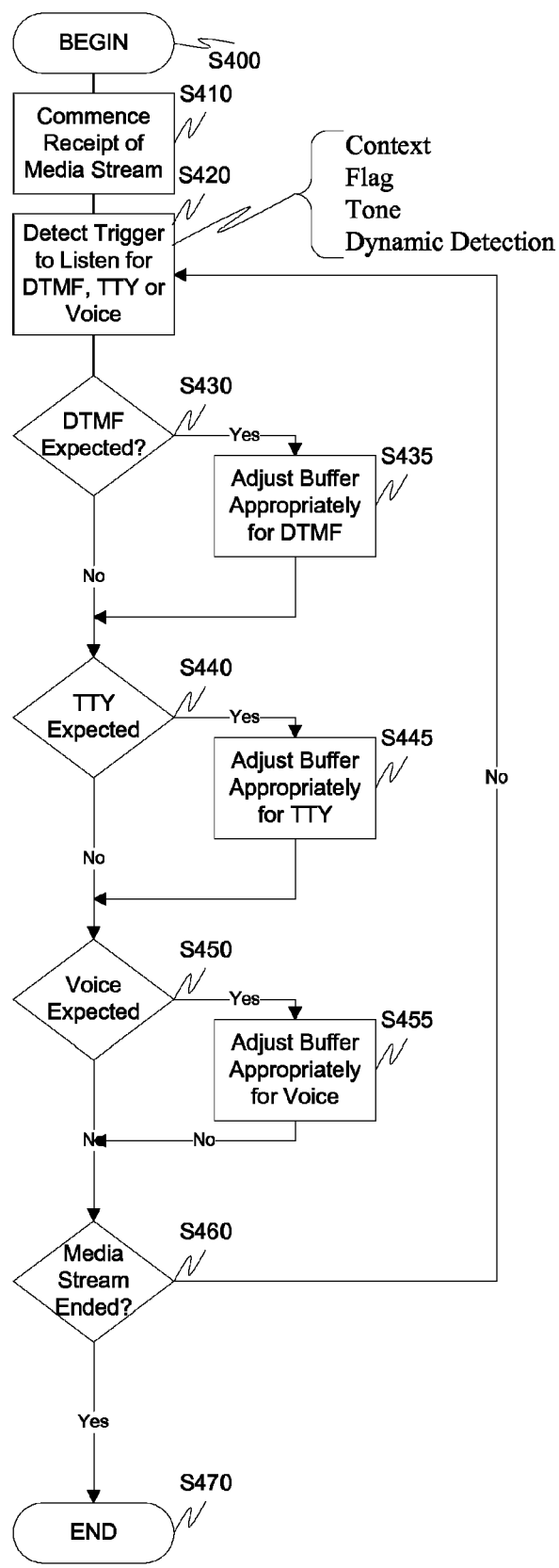
FIG. 4 is a flow chart outlining the exemplary method for jitter buffer management according to this invention.

The invention will be described below in relation to a communications environment. Although well suited for use with circuit-switched or packet-switched networks, the invention is not limited to use with any particular type of communications system or configuration of system elements and those skilled in the art will recognize that the disclosed techniques may be used in any application in which it is desirable to provide more optimized communications. For example, the systems and methods disclosed herein will also work well with SIP-based communications systems and endpoints. Moreover, the various endpoints described herein can be any communications device such as a telephone, speakerphone, cellular phone, SIP-enabled endpoint, softphone, PDA, conference system, video conference system, wired or wireless communication device, VoIP, or in general any communications device that is capable of sending and/or receiving voice and/or data communications.

The exemplary systems and methods of this invention will also be described in relation to software, modules, and associated hardware and network(s). In order to avoid unnecessarily obscuring the present invention, the following description omits well-known structures, components and devices that may be shown in block diagram form, are well known, or are otherwise summarized.

For purposes of explanation, numerous details are set forth in order to provide a thorough understanding of the present invention. It should be appreciated however, that the present invention may be practiced in a variety of ways beyond the specific details set forth herein.

FIG. 1 illustrates an exemplary voicemail system 100 according to this invention. The voicemail system includes a voicemail server 110, a media stream 120, buffer 130, dynamic buffer management module 140, and voice detection module/DTMF detection module 150.

In operation, a media stream 120, and one or more inputs, such as DTMF inputs and/or TTY inputs, are received by the voicemail system, and in particular the buffer 130. As discussed, the dynamic buffer management module 140 varies the size of the buffer 130 dynamically based on one or more of the menu the position in the voicemail system, detection of voice information in the media stream, detection of DTMF information in the media stream, and detection of TTY information in the media stream. More specifically, the voice/DTMF/TTY detection module 150 can monitor the incoming media stream 120. Upon detection of one or more of the DTMF, TTY, or voice information, the dynamic buffer management module 140 adjusts the size of the buffer 130 to an appropriate length based on the type of detected information.

In accordance with another exemplary embodiment, the dynamic buffer management module 140 monitors the TUI menu structure within the voicemail server 110, and anticipating a type of legal input expected from a caller, dynamically updates the buffer 130 based on the expected caller's input. Similarly, the voicemail server 110 can dynamically update the buffer 130 on the announcement set selected by a user. For example, the selection of a specific announcement set can be correlated via a table to a preferred configuration of the buffer. When a specific announcement set is selected, the selected announcement set is correlated to a buffer size, and the buffer updated accordingly.

FIG. 2 illustrates an exemplary IVR system 200 according to this invention. More specifically, the exemplary system includes the IVR server 210, media stream 220, buffer 230, dynamic buffer management module 240, and the context module/flag detection/trigger detection module 250. In operation, media stream 220 is received by the IVR server 210, and, in particular, buffered in buffer 230. The dynamic buffer management module 240, cooperating with the context module 250 monitors the state of the IVR system or expected user inputs. As a user navigates through the TUI of the IVR system 200, the dynamic buffer management module 240, in cooperation with the context module 250, adapts the size of the buffer 230 depending on the expected type of input from a user. As discussed, this input can be one or more of DTMF inputs, TTY inputs, and voice inputs.

In a similar manner, and as previously discussed, a flag, such as a binary flag in the code of the TUI, can be detected with the cooperation of the flag detection module 250. Then, in conjunction with a dynamic buffer manager module 240, the flag triggers the updating of the buffer 230. In accordance with one exemplary embodiment, the flag can be present at both the beginning and end of an expected response from a user. For example, the IVR system 210 can play an announcement or "Please enter your account number followed by the pound key. {enable DTMF buffer}" A user then enters, via the touch-tone keypad, their account number followed by the pound key. In this scenario, the {xxx} denotes the adaptation of the jitter buffer to a size appropriate for DTMF user responses, and the pound key "#", the return of the buffer, to, for example, some predetermined state. In a similar manner, the trigger detection portion of module 250 can detect, for example, key words in a TUI menu structure, and based on these key words, and cooperating with the dynamic buffer manager module 240, modify the size the buffer 230 based on the expected legal input from a user.

In another example, the IVR server 210 asks the caller for their name. The context module 250 can detect the question "Please state your name, followed by the # key" and adjust the buffer 230 to size appropriately for voice information. The system could then detect quiet on the line when the user has finished speaking their name and switch the buffer 230 to a DTMF appropriately-sized buffer to anticipate the entry of the "#" key.

FIG. 3 illustrates an exemplary Auto Attendant system 300 according to this invention. The exemplary system 300 includes an Auto Attendant server 310, and input media stream 320, buffer 330, dynamic buffer management module 340, and context module/flag detection module/trigger detection module 350.

In operation, and similar to the other systems, a media stream 320 is received by the Auto Attendant system 310. More specifically, the media stream 320 is received by buffer 330 which is dynamically adjustable by the dynamic buffer management module 340. Upon receipt of the incoming media stream, the dynamic buffer management module 340, with the cooperation of the context/flag/trigger detection module 350 monitors the menu structure presented by the Auto Attendant system 310 and anticipates expected inputs from a user. If a DTMF input is expected from a user, the dynamic buffer management module 340 adjusts the buffer 330 appropriately for DTMF inputs. If a TTY input(s) is expected from the user via the media stream 320, the dynamic buffer management module 340 adjusts the buffer 330 as appropriate for TTY signals. If voice information is expected, the dynamic buffer management module 340 adjusts the size buffer 330 as appropriate for voice information received via the media stream 320.

While certain types of triggers, flags, and dynamic adjustment of various systems 110, 210, 310 have been described specifically in relation to individual systems, it is to be fully appreciated that the various functionality disclosed herein can be interchanged between the various systems with equal success.

FIG. 4 illustrates an exemplary method for dynamic jitter buffer management according to this invention. In particular, control begins step S400 and continues to step S410. In step S410, a media stream is received. Next, in step S420, one or more triggering events are detected, the triggering events denoting that an expected legal input from a user is one or more of DTMF, TTY, or voice information. These triggers, as discussed, can be one or more of context based, such as context with a TUI, flag based, such as a flag, such as a binary flag within the TUI code, based on a tone played by a system, dynamic, for example, based on the detection of voice information in the media stream, or in general based on any information that would allow the system to switch buffer size. Control then continues to step S430.

In step S430, a determination is made whether DTMF information is expected. If DTMF information is expected, control continues to step S435. Otherwise, control jumps to step S440.

In step S435, the buffer is adjusted appropriately for DTFM signals. Control then continues step S440.

In step S440, a determination is made whether TTY information is expected. If TTY information is expected, control continues to step S445. Otherwise, control jumps to step S450.

In step S445, the buffer is adjusted appropriately for TTY signals. Control then continues step S450.

In step S450, a determination is made whether voice information is expected. If voice information is expected, control continues to step S455. Otherwise, control jumps to step S460.

In step S455, the buffer is appropriately adjusted for voice information. Control then continues to step S460.

In step S460, a determination is made whether one or more of the media stream or TUI menu structure has ended. If it has not ended, control jumps back to step S420, with control otherwise continuing to step S470 where the control sequence ends.

A number of variations and modifications of the invention can be used. It would be possible to provide or claims for some features of the invention without providing or claiming others.

The exemplary systems and methods of this invention have been described in relation to enhancing communications, and in particular a jitter buffer. However, to avoid unnecessarily obscuring the present invention, the description omits a number of known structures and devices. This omission is not to be construed as a limitation of the scope of the claimed invention. Specific details are set forth to provide an understanding of the present invention. It should however be appreciated that the present invention may be practiced in a variety of ways beyond the specific detail set forth herein.

Furthermore, while the exemplary embodiments illustrated herein show various components of the system collocated; certain components of the system can be located remotely, at distant portions of a distributed network, such as a LAN, cable network, and/or the Internet, or within a dedicated system. Thus, it should be appreciated, that the components of the system can be combined in to one or more devices, such as a gateway, or collocated on a particular node of a distributed network, such as an analog and/or digital communications network, a packet-switch network, a circuit-switched network or a cable network.

It will be appreciated from the preceding description, and for reasons of computational efficiency, that the components of the system can be arranged at any location within a distributed network of components without affecting the operation of the system. For example, the various components can be located in a switch such as a PBX and media server, gateway, a cable provider, enterprise system, in one or more communications devices, at one or more users' premises, or some combination thereof. Similarly, one or more functional portions of the system could be distributed between a communications device(s) and an associated computing device.

Furthermore, it should be appreciated that the various links, such as link 5, connecting the elements can be wired or wireless links, or any combination thereof, or any other known or later developed element(s) that is capable of supplying and/or communicating data to and from the connected elements. These wired or wireless links can also be secure links and may be capable of communicating encrypted information. Transmission media used as links, for example, can be any suitable carrier for electrical signals, including coaxial cables, copper wire and fiber optics, and may take the form of acoustic or light waves, such as those generated during radio-wave and infra-red data communications.

Also, while the flowcharts have been discussed and illustrated in relation to a particular sequence of events, it should be appreciated that changes, additions, and omissions to this sequence can occur without materially affecting the operation of the invention.

In yet another embodiment, the systems and methods of this invention can be implemented in conjunction with a special purpose computer, a programmed microprocessor or microcontroller and peripheral integrated circuit element(s), an ASIC or other integrated circuit, a digital signal processor, a hard-wired electronic or logic circuit such as discrete element circuit, a programmable logic device or gate array such as PLD, PLA, FPGA, PAL, special purpose computer, any comparable means, or the like. In general, any device(s) or means capable of implementing the methodology illustrated herein can be used to implement the various aspects of this invention.

Exemplary hardware that can be used for the present invention includes computers, handheld devices, telephones (e.g., cellular, Internet enabled, digital, analog, hybrids, and others), and other hardware known in the art. Some of these devices include processors (e.g., a single or multiple microprocessors), memory, nonvolatile storage, input devices, and output devices. Furthermore, alternative software implementations including, but not limited to, distributed processing or component/object distributed processing, parallel processing, or virtual machine processing can also be constructed to implement the methods described herein.

In yet another embodiment, the disclosed methods may be readily implemented in conjunction with software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with this invention is dependent on the speed and/or efficiency requirements of the system, the particular function, and the particular software or hardware systems or microprocessor or microcomputer systems being utilized.

In yet another embodiment, the disclosed methods may be partially implemented in software that can be stored on a computer-readable storage medium, executed on programmed general-purpose computer with the cooperation of a controller and memory, a special purpose computer, a microprocessor, or the like. In these instances, the systems and methods of this invention can be implemented as a program embedded on personal computer such as an applet, JAVA® or CGI script, as a resource residing on a server or computer workstation, as a routine embedded in a dedicated measurement system, system component, or the like. The system can also be implemented by physically incorporating the system and/or method into a software and/or hardware system.

Although the present invention describes components and functions implemented in the embodiments with reference to particular standards and protocols, the invention is not limited to such standards and protocols. Other similar standards and protocols not mentioned herein are in existence and are considered to be included in the present invention. Moreover, the standards and protocols mentioned herein and other similar standards and protocols not mentioned herein are periodically superseded by faster or more effective equivalents having essentially the same functions. Such replacement standards and protocols having the same functions are considered equivalents included in the present invention.

The present invention, in various embodiments, configurations, and aspects, includes components, methods, processes, systems and/or apparatus substantially as depicted and described herein, including various embodiments, subcombinations, and subsets thereof. Those of skill in the art will understand how to make and use the present invention after understanding the present disclosure. The present invention, in various embodiments, configurations, and aspects, includes providing devices and processes in the absence of items not depicted and/or described herein or in various embodiments, configurations, or aspects hereof, including in the absence of such items as may have been used in previous devices or processes, e.g., for improving performance, achieving ease and/or reducing cost of implementation.

The foregoing discussion of the invention has been presented for purposes of illustration and description. The foregoing is not intended to limit the invention to the form or forms disclosed herein. In the foregoing Detailed Description for example, various features of the invention are grouped together in one or more embodiments, configurations, or aspects for the purpose of streamlining the disclosure. The features of the embodiments, configurations, or aspects of the invention may be combined in alternate embodiments, configurations, or aspects other than those discussed above. This method of disclosure is not to be interpreted as reflecting an intention that the claimed invention requires more features than are expressly recited in each claim. Rather, as the following claims reflect, inventive aspects lie in less than all features of a single foregoing disclosed embodiment, configuration, or aspect. Thus, the following claims are hereby incorporated into this Detailed Description, with each claim standing on its own as a separate preferred embodiment of the invention.

Moreover, though the description of the invention has included description of one or more embodiments, configurations, or aspects and certain variations and modifications, other variations, combinations, and modifications are within the scope of the invention, e.g., as may be within the skill and knowledge of those in the art, after understanding the present disclosure. It is intended to obtain rights which include alternative embodiments, configurations, or aspects to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

The invention claimed is:

1. A jitter buffer management method comprising:
   detecting a trigger; and
   based on the detected trigger, dynamically updating a size of a jitter buffer based on a predicted legal input following the detected trigger, wherein the trigger is one or more of a flag, a Telephone User Interface (TUI) location, a binary flag, speech detection, a context detection and a result of a predictive analysis, and wherein the trigger is detected at both the beginning and the end of the predicted legal input.

2. The method of claim 1, wherein the size is one or more of a size appropriate for DTMF information, TTY information and voice information.

3. The method of claim 1, wherein the jitter buffer is sized appropriately for one or more of DTMF information, TTY information and voice information.

4. The method of claim 1, wherein the jitter buffer is associated with one or more of a voice mail server, an interactive voice response server and an auto attendant server.

5. The method of claim 1, further comprising monitoring an input data stream to detect a change in information.

6. The method of claim 1, wherein the trigger is embedded in a TUI menu structure.

7. The method of claim 1, wherein the trigger is based on a selected announcement set.

8. The method of claim 1, wherein the jitter buffer can be updated several times during a conversation.

9. A non-transitory computer-readable information storage media having stored thereon instructions, that when executed by a processor, perform the steps of claim 1.

10. The method of claim 1, wherein the legal input is a permissible input.

11. A jitter buffer management system comprising:
a detection module that detects a trigger; and
a dynamic buffer management module that, based on the detected trigger, dynamically updates a size of a jitter buffer based on a predicted legal input following the detected trigger, wherein the trigger is one or more of a flag, a Telephone User Interface (TUI) location, a binary flag, speech detection, a context detection and a result of a predictive analysis, and wherein the trigger is detected at both the beginning and the end of the predicted legal input.

12. The system of claim 11, wherein the size is one or more of a size appropriate for DTMF information, TTY information and voice information.

13. The system of claim 11, wherein the jitter buffer is sized appropriately for one or more of DTMF information, TTY information and voice information.

14. The system of claim 11, wherein the jitter buffer is associated with one or more of a voice mail server, an interactive voice response server and an auto attendant server.

15. The system of claim 11, wherein an input data stream is monitored to detect a change in information.

16. The system of claim 11, wherein the trigger is embedded in a TUI menu.

17. The system of claim 11, wherein the trigger is based on a selected announcement set.

18. The system of claim 11, wherein the jitter buffer can be updated several times during a conversation.

19. The system of claim 11, wherein the jitter buffer is for an RTP media stream.

20. The system of claim 11, wherein the size of the jitter buffer is zero.

* * * * *